(No Model.)
A. GERDUM.
HYDROSTATIC SCALE.
No. 459,001. Patented Sept. 8, 1891.
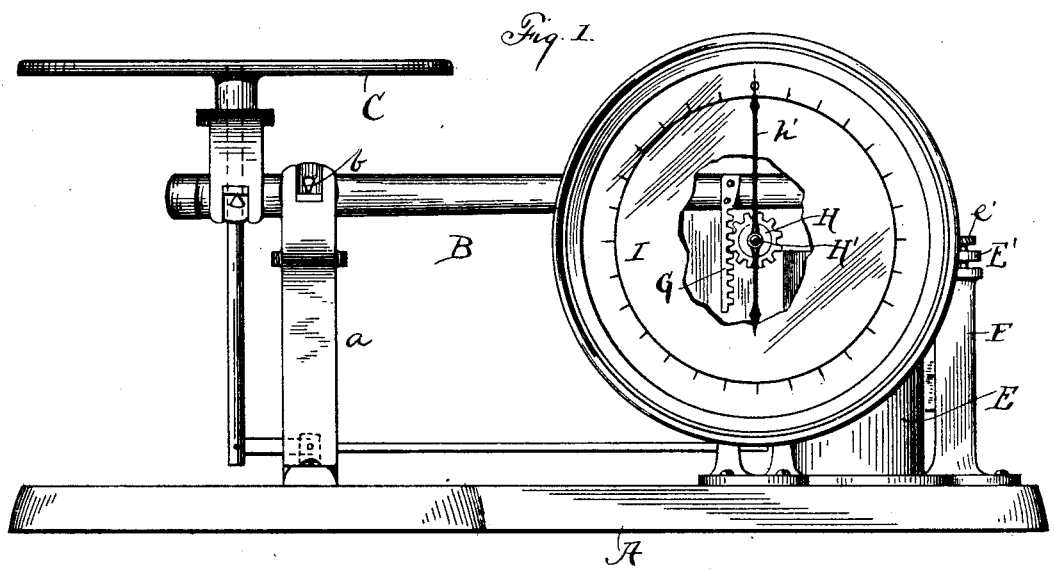
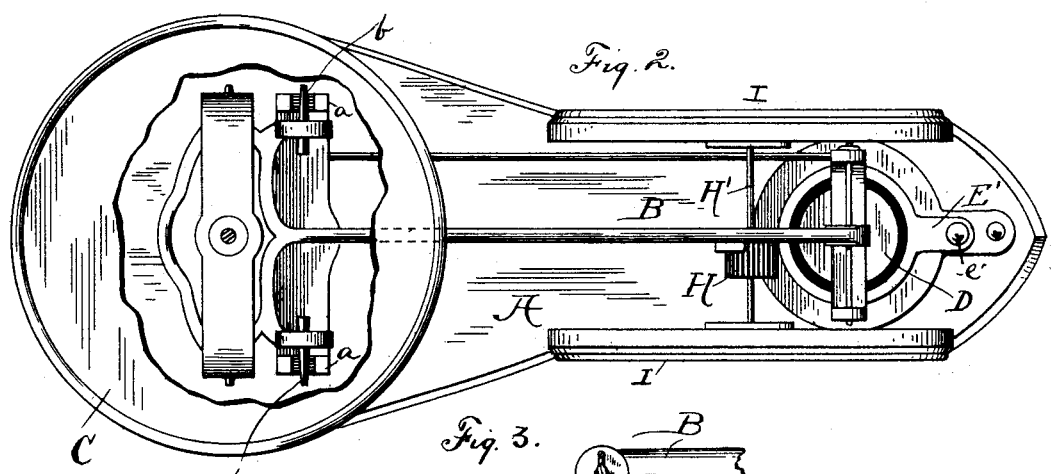
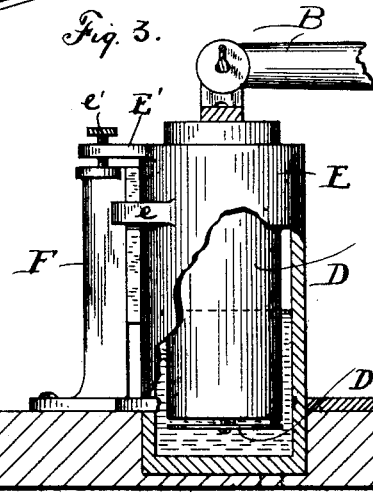
Witnesses:
Inventor:
Albert Gerdum

UNITED STATES PATENT OFFICE.

ALBERT GERDUM, OF CLEVELAND, OHIO.

HYDROSTATIC SCALE.

SPECIFICATION forming part of Letters Patent No. 459,001, dated September 8, 1891.

Application filed March 21, 1891. Serial No. 385,859. (No model.)

*To all whom it may concern:*

Be it known that I, ALBERT GERDUM, of Cleveland, in the county of Cuyahoga and State of Ohio, have invented certain new and useful Improvements in Weighing-Scales; and I do hereby declare the following to be a full, clear, and exact description of the invention, such as will enable others skilled in the art to which it pertains to make and use the same.

My invention relates to improvements in weighing-scales in which a counter-balance is suspended from the scale-beam in a column of mercury, the scale-beam being operatively connected with a lateral spindle bearing one or more pointers that indicate on corresponding dial or dials the article being weighed, causing more or less displacement of the mercury inversely, according to the gravity of such article.

In the accompanying drawings, Figure 1 is a side elevation, partly in section. Fig. 2 is a plan, partly in section. Fig. 3 is a side elevation in detail, portions being broken away to show the internal construction.

A represents the supporting-base provided with standards $a\ a$ for supporting the scale-beam B, the latter at $b\ b$ being fulcrumed in the usual manner on so-called "knife-edges." On the short arm of the scale-beam is mounted the platform C for receiving the article to be weighed. From the long arm of the scale-beam is suspended the counter-balance D, this counter-balance extending down loosely into pot E, the latter being partially filled with mercury. Pot E has lateral lugs $e$, arranged in pairs to operate astride the stationary post F, the latter serving as a guide for the pot, and the pot having a lateral arm E', extending over the line of the post, this arm being provided with a screw $e'$, engaging the top end of the post, and by manipulating this screw the pot can be raised or lowered a limited distance for adjustment—that is to say, for balancing the scale. To the one side of the scale-beam is attached a vertical rack G, the teeth of which rack engage the pinion H, mounted on the lateral spindle H', this spindle at one or both extremes having a pointer $h'$, adapted to indicate on the opposing dial I. Usually two dials are provided and two pointers on the spindle, so that the weight of the article can be seen from either side of the scale. The parts having been assembled, a quantity of mercury is poured into pot E, after which the pot is adjusted vertically by means aforesaid until the pointer stands at zero with the scale empty.

In weighing the article, according to the gravity thereof, draws the counter-balance D more or less out of the mercury. Hence the displacement of mercury is inversely according to the gravity of the article weighed. Preferably a small quantity of glycerine or other suitable material is placed on top of the mercury to prevent the latter from evaporating. To prevent the scale from vibrating too much or being too sensitive, a disk D' is secured to the under side of the counter-balance to block the way a short distance therefrom, and the friction of this disk in the mercury prevents undue vibration in the scale-beam. Of course any number of such disks can be used, if so desired. The scale thus constructed is sensitive and is not perceptibly affected by climatic or thermal changes, and is consequently reliable at all times and under all conditions and circumstances, and it is evident that the scale can at any time be balanced in a moment and with perfect accuracy.

What I claim is—

1. A scale-beam provided with pointers and dials, substantially as indicated, and a counter-balance suspended from the scale-beam into a column of mercury, the vessel containing the mercury having a screw or equivalent device for adjusting it vertically, substantially as set forth.

2. In combination, a scale-beam, pointers, dials, and counter-balance suspended from the scale-beam in a column of mercury, the counter-balance having one or more disks for engaging the mercury to prevent undue vibration, substantially as set forth.

In testimony whereof I sign this specification, in the presence of two witnesses, this 24th day of February, 1891.

ALBERT GERDUM.

Witnesses:
   C. H. DORER,
   WARD HOOVER.